3,437,623
GRAFTED WAXES
William J. Heintzelman and Michael I. Naiman, St. Louis, Mo., assignors to Petrolite Corporation, Wilmington, Del., a corporation of Delaware
No Drawing. Filed Feb. 14, 1966, Ser. No. 527,044
Int. Cl. C08f 3/62; C09g 1/10
U.S. Cl. 260—28.5                11 Claims

ABSTRACT OF THE DISCLOSURE

Wax-graft copolymer compositions of (1) waxes such as tank bottom microcrystalline waxes, plastic microcrystalline waxes, solvent extracted microcrystalline waxes, Fischer-Tropsch waxes and the like each having a molecular weight of from about 400 to about 3,000, a melting point of from about 140° F. to about 200° F. and a penetration of about 0+ to about 20 (ASTM Test Method D5-25) and (2) a polymerized unsaturated monomer capable of free radical initiated polymerization grafted to said wax, and also polishes and carbon paper inks containing such wax-graft copolymer compositions.

This invention relates to waxes having polymers grafted thereto. More particularly this invention relates to graft copolymers of waxes and unsaturated monomers. This invention also relates to mixtures of wax-graft copolymers and homopolymers. This invention also relates to processes of preparing, and to uses for, these compositions.

Despite the outstanding properties of waxes, it is often desirable to modify their properties so as to make them more suitable for specific uses. The enhancement of wax properties has often been accomplished by the addition of various homopolymers or copolymers to waxes to give physical mixtures. This procedure, however, is limited and not entirely satisfactory for various reasons such as, for example, the limited compatability of the materials.

We have now discovered that waxes can be modified by grafting polymers thereon so as to give materials with specific performance properties, such as, for example, in regard to solubility, hardness, adhesion and cohesion, gloss, etc. These wax-graft copolymers do not suffer from the usual drawbacks of physical mixtures of waxes and homopolymers and copolymers, particularly with respect to compatability.

In general, the grafting process involves imparting reactive sites to the wax so as to initiate polymerization, followed by the polymerization of the unsaturated monomer, such as a vinyl monomer, from these reactive grafting sites as shown in the following equation:

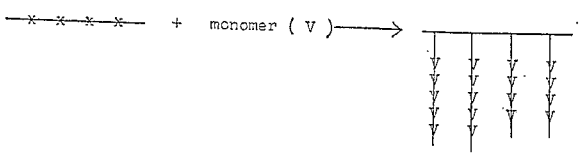

where $x$ represents an active site and V is a vinyl monomer or mixture of vinyl monomers, i.e., the V's may be the same or different. The length of the grafted chains may be equal or unequal.

In addition, graft growth may occur by the formation of reactive sites on a grafted side chain (Vn) so as to give a branched grafted chain.

Many other variations will be obvious to one skilled in the art.

Any wax capable of having reactive sites formed thereon can be employed. Thus, the wax substrate to be employed in preparing the graft polymers may include, by way of example, microcrystalline wax, Fischer-Tropsch wax, etc., mixtures of these materials, etc.

The waxes employed herein are preferably of low molecular weight, for example, under about 3,000, such as about 400–3,000, for example about 500–1,500, but preferably about 600–1,000. Preferably the waxes have melting points of from about 140° F. such as about 140°–220° F., for example from about 170°–205° F., but preferably about 200° F.±15. Preferably, the waxes have penetrations (ASTM Test Method D5–25) of under about 30, preferably such as about 0 + to 20, for example under about 10, but preferably under about 4.

Preferred waxes meeting these specifications include tank bottom microcrystalline waxes, plastic microcrystalline waxes, solvent extracted microcrystalline waxes, Fischer-Tropsch waxes and the like.

Any suitable free-radical producing agent capable of forming reactive sites can be employed. These include peroxides, hydroperoxides, etc., for example benzoyl peroxide, acetyl peroxide, 2,4-dichlorobenzoyl peroxide, tert-butyl peroxide, tert-butyl hydroperoxide, methyl benzyl hydroperoxide, cumene hydroperoxide, peracetic acid, tert-butyl permaleic acid, lauryl peroxide, methyl ethyl ketone peroxide, dicumyl peroxide, di-tert-butyl diperphthalate, tert-butyl peracetate and the like.

Other sources of free radicals besides peroxides can also be employed, for example high energy ionizing irradiation, etc., cobalt in conjunction with hydroperoxides, inorganic peroxy compounds such as persulfates, hydrogen peroxides, etc., azo compounds of the general formula R–N=N–R such as azobenzene, azomethane, azobisisobutyronitrile, etc., acyl-aryl nitrosoamides such as nitrosoanilide, etc.

A wide variety of unsaturated monomers capable of free radical polymerization can be employed. For example, hydrocarbon monomers such as ethylene, propylene, butylene, isobutylene, isoprene, etc.; diolefins such as butadiene, substituted butadienes, etc.; aromatic olefins such as styrene and substituted styrenes, side chain substituted styrene, for example alpha-methyl styrene and ring substituted styrenes such as for example halostyrenes, alkylstyrenes, alkoxystyrenes, nitrostyrenes, cyanostyrenes, carboxstyrenes, hydroxystyrenes, aminostyrenes, phenylstyrenes, etc., styrenes containing more than one substituted group of the same or different types; vinyl type carboxylates such as acrylic and methacrylic type monomers, including both free acids and esters, and combinations thereof, including alkyl esters (e.g. methyl, ethyl, propyl, butyl, etc.), phenyl, etc., esters; derivatives thereof, such as amides, for example acrylamide, methacrylamide, etc.; methacrylonitrile and related monomers, etc.; vinyl esters such as vinyl acetate, isopropenyl acetate, vinyl formate, vinyl propionate, vinyl butyrate, etc.; vinyl halides such as vinyl chloride, vinylidene chloride, fluorovinyl monomers; vinyl ethers such as vinyl alkyl ethers, for example methyl vinyl ether, ethyl vinyl ether, isopropyl vinyl ether, etc.; sulfur vinyl ethers such as vinyl thioethers (e.g. vinyl alkyl sulfides, vinyl sulfoxide, vinyl sulfonates, etc.; nitrogen vinyl compounds such as vinyl carbazole, vinyl pyrrolidone, etc.; vinyl ketones such as alkyl vinyl ketone, for example methyl vinyl ketone, isopropenyl methyl ketone, etc. Miscellaneous vinyl compounds such as maleic anhydride, maleic esters, acrolein, methacrolein, chloroprene, etc., can also be employed.

These monomers have at least one C=C group, and more preferably at least one terminal $CH_2$ group doubly bonded to a second carbon. More preferably the second carbon is bonded to a negative group, for example a phenyl radical, such as in styrene, a halogen such as in vinyl chloride, an acetoxy group such as in vinyl acetate, a carboxyl group such as in acrylic and methacrylic acid; a carboxyl ester group such as in acrylic and methacrylic esters, a nitrile group such as in acrylonitrile and methacrylonitrile, an amido group such as in acyl amide, methacrylamide, etc.

The type of monomers which are suitable for grafting are those which undergo free radical initiated polymerization, more commonly referred to as vinyl-type polymerization. One particular type of monoethylenic monomer with which this invention is concerned can be represented by the following generic formula:

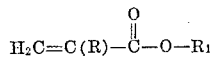

where R is either hydrogen or a methyl radical and $R_1$ is either hydrogen or a linear or branched alkyl radical. The chain lengths of these alkyl substituents are not narrowly critical. However, lower alkyls, either linear or branched chained and containing 1 to 8 carbon atoms are generally preferred.

Illustrative of the monomers intended to be embraced within the scope of the present invention are ethyl acrylate, butyl acrylate, ethyl methacrylate, butyl methacrylate, octyl methacrylate, etc.

Another particular type of monoethylenic monomers with which this invention is concerned may be represented by the following generic formula:

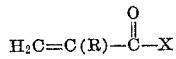

where R is either hydrogen or a methyl group and X is a hydroxy group, or a monoalkyl or dialkyl substituted amino group. The chain lengths of these alkyl substituents are not narrowly critical, however, lower alkyls, either linear or branch-chained and containing 1 to 4 carbon atoms each are generally preferred.

Illustrative of the monomers which it is intended to embrace within the scope of the present invention are those following: N-propyl acrylamide, N-normal butyl acrylamide, N,N-di-tert-butyl acrylamide, N,N-dimethyl acrylamide, N,N-diisobutyl acrylamide, N,N-methyl butyl acrylamide and N,N-propyl isobutyl acrylamide.

The amount of polymer grafted on the wax can vary widely depending on many factors including the reactivity of the particular system employed, the properties desired in the grafted wax, and the like. Thus, the weight percent of grafted polymer as a percent of total weight of polymer-wax composition can vary, by illustration from about 1% or more, such as 1–99% or more, for example 3–85%, but preferably about 5–80%. The optimum percentage will depend on the particular wax-polymer composition and the system in which it is to be used.

Various factors are generally considered in the preparation of grafted waxes including the following:
 (1) A free radical producing means.
 (2) The chemical nature of the monomer grafted.
 (3) The ratio of monomer to wax.
 (4) Temperature and time of reaction.
 (5) The presence or absence of solvents.

In addition to the formation of the graft polymer when the monomer is reacted with wax, a homopolymer of the monomer employed is also formed.

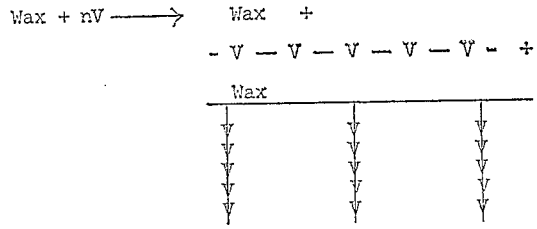

Thus, the gross reaction product resulting when a monomer is graft-polymerized to wax may include some ungrafted wax, some homopolymer of the monomer V, and some grafted wax. However, the relative amount of $Vn$ present as homopolymer compared to that present in the wax-graft copolymer can be controlled for example by reaction conditions, by varying the ratio of monomer to wax in the initial mixture of these reactants charged to the reaction vessel, etc. As this ratio increases, the proportion of $Vn$ present as homopolymer also increases. The maximum ratio at which substantially no homopolymer of V is formed varies with the monomer employed.

Other factors influence the grafting reaction. The amount of free radical forming catalyst employed is preferably in the range of 0.3 to 10 percent by weight of the monomer. In general the upper limit for catalyst concentration is primarily an economic rather than a chemical one. No advantage or necessity is seen in employing concentrations in excess of 20 percent of catalyst by weight of monomer. Time and temperature are also factors which influence the reaction. Thus, the time required to obtain highest grafting efficiency generally reaches a maximum beyond which it is not practical to go. To some extent this depends on the monomer, that is to say with monomers which graft readily the time required to get maximum grafting differs somewhat from those which are not so readily grafted. Generally speaking, however, most of the grafting occurs during the first 3 to 12 hours of reaction.

The temperature of the reaction is not narrowly critical form or in solution and to decompose the catalyst into but should be high enough to keep the wax in liquid free radicals at a reasonable rate. Thus, 60° C. to 225° C. constitutes a preferred reaction temperature range.

The gross reaction products obtained by the procedure of this invention are mixtures of unchanged wax, wax-grafted copolymer and homopolymer derived from the vinyl monomer used in the reaction. The content of this latter can be controlled, as stated, by varying the ratio of the monomer to wax in the initial reaction charge. Separation of the various components of the reaction product can be accomplished by reason of their different solution behavior. This again will vary with the monomer employed for grafting. In general, however, it is more difficult to separate the grafted wax from the wax since usually the solution behavior of the grafted wax is similar to that of the wax.

That these grafted waxes are definite compounds and not more mechanical mixtures of two components is determined by the fact that they cannot be separated into the respective components by extraction with suitable solvents as would be possible were they mechanical mixtures. They all have a "backbone" of wax as determined by infra-red spectrometry.

It is not necessary, however, to isolate the grafted wax to obtain useful products. These descriptions of the modifications which can be made in the wax molecule are only illustrative of the versatility of, and usefulness of, wax-graft copolymers. For many purposes the gross reaction products obtained by graft polymerization are useful as such.

Although it is generally preferred to carry out the graft polymerization in the absence of solvent, the reaction can also be carried out in solution, employing hydrocarbon or chlorinated hydrocarbon solvents having low transfer constants, such as for example, benzene, chlorobenzene or dichlorobenzene, etc. Dichlorobenzene is the preferred solvent employed. A useful concentration has been found to be one to about ten parts by weight of solvent to one part of wax.

The wax is usually melted or dissolved in the appropriate solvent and then heated to the desired temperature. The monomer and catalyst are then added gradually and the reaction mixture is then heated for a certain period of time, varying from ½ to 24 hours. The reaction is usually substantially complete in a period of 3 to 12 hours. The reaction may also be carried out in a closed system under pressure. The volatiles are then removed by evaporation and, if desired, the last traces usually are removed by milling on differential rolls.

The examples outlined in Table I are prepared by the following procedure.

100 grams of wax in an autoclave under a blanket of nitrogen is heated to the temperature specified. A mixture of the vinyl monomer and the peroxide, either with or without solvent, is added to the wax over a period of about 0.25 hour. After addition is complete, the reaction mixture is heated for an additional period of about four hours. The reacted wax is then treated with any suitable solvent such as methanol to extract the homopolymer. The saponification number of the residuary grafted wax is then determined. Melting points are taken according to ASTM D127-49 and penetration numbers according to ASTM D5-25. The results are specified in the following Table I.

the vehicle to impart certain properties such as plasticity and toughness, and paraffin wax may be used as a substitute for part of the wax to give a cheaper formulation. One of the unique properties of many of the wax-graft copolymers of this invention is that they are able to carry a lot of paraffin wax into the ink formulation without detracting greatly from the desirable characteristics required. In this respect, these products are comparable to carnauba and ouricury and superior to montan. Other materials may be used in carbon paper inks such as clay to cheapen the formula, oleic acid which acts as a dye solubilizer, rubbers to give toughness, dispersing agents, etc.

The consistency and other properties of the ink can be varied to a certain degree by the choice of the oil which is used. For example, various oils ranging from a relatively light mineral oil (100 SUS at 100° F.) up to heavy oils and petrolatums may be used. These oils and petrolatums

TABLE 1

| Example | Wax type (100 g.) | Vinyl monomer (g.) | Peroxide (g.) | Temp., °C. | Sap. No. |
|---|---|---|---|---|---|
| 1 | Micro, ° C., M.P. 190-5° F., penetration No. 3. | Vinyl acetate (100) | Di-t-butyl (3) | 180 | 32 |
| 2 | do | do | do | 200 | 39 |
| 3 | do | Vinyl acetate (200) | do | 200 | 54 |
| 4 | do | Vinyl acetate (300) | do | 200 | 75 |
| 5 | Fischer-Tropsch, M.P. 212° F., penetration No. 4. | Acrylic acid (12) | do | 185 | 61 |
| 6 | do | Acrylic acid (24) | Di-t-butyl (6) | 185 | 83 |
| 7 | do | Methyl methacrylate (34) | do | 185 | 7 |
| 8 | do | Acrylic acid (12) plus diethyl maleate (28). | Di-t-butyl (3) | 185 | 95 |
| 9 | do | Methyl acrylate (14) | do | 185 | 55 |
| 10 | do | Styrene (50) | do | 185 | |
| 11 | do | Styrene (30) plus Acrylic Acid (12). | Di-t-butyl (4) | 185 | 60 |

Note.—Without solvent (Examples 1-4); monomer and peroxide added as a 10-20% solution in o-dichlorobenzene (Examples 5-11).

USE IN CARBON PAPER INKS

This section deals with the utilization of the wax-graft copolymers of this invention in carbon paper inks. There are several articles, patents, and other published literature which discuss various types of carbon paper, particularly in regard to formulation of the various ingredients, test procedures, utilization of various waxes, etc. See, for example, U.S. Patent No. 2,426,248, dated Aug. 26, 1947, to Sugarman; Chapter 12, entitled, "Carbon Papers and Other Duplicating Papers," by R. R. Wissinger in the book edited by R. H. Mosher entitled "Specialty Papers," published by the Chemical Publishing Co., New York, in 1950; the paper on the "Rheology of Carbon Paper Inks" by E. S. Gale and B. J. Staneslow in the American Ink Maker issue of December 1950; the paper on "Converting of Carbon Papers" by F. B. McFarland in the Paper Trade Journal, volume 137, pages 230–237 (1953); and the book Commercial Waxes by H. Bennett, pages 368, 377 and 429–431, published by Chemical Publishing Co., New York, in 1944.

There are many different types of carbon paper and related materials in use today. The three most widely used types of carbon paper are the one-time carbon which is used once and then thrown away, the pencil carbon which may also be used once, or may be used many times; and the typewriter carbon. The one-time carbon is the most widely used type of carbon paper and it finds wide application in business and multiple forms and other applications. In the production of one-time carbon paper, cost is all important. On the other hand, for typewriter carbons, quality rather than cost is important, and for pencil carbons, cost and quality are intermediate in importance.

The carbon paper ink may be viewed simply as a mixture containing a wax, an oil, a pigment and a dye. The oil serves as the vehicle and the pigment and dye give the color and some of the body. Most of the desirable characteristics in the finished ink must be supplied by the wax and these will be described later. Other materials may also be used in carbon paper to give it certain properties. For example, petrolatum may be used as part or all of may be colorless or range in color up to black. The darker colored materials are generally better dispersants for the pigment.

There are numerous pigments which may be used in typical formulations. The most common pigment is carbon black and this comes in numerous grades such as channel blacks, furnace blacks, etc., and each of these grades come in many modifications. The channel blacks are, in general, the most desirable as far as quality is concerned, but on the other hand, they are also the most expensive. The high-grade channel blacks have an oxygenated surface which aids in its dispersion and which can absorb the dye and other materials. As one goes down the scale of carbon blacks, lesser amounts of this very desirable oxygenated surface are encountered. Blue pigments may also be used, such as Milori Blue, and others, as can many other blue pigments. Numerous other colored pigments may also be used as described in the literature.

Many dyes are commonly employed in carbon paper inks. The common ones are Methyl Violet, Nigrosine, Victorial Blue, etc., and salts of these materials. It is advantageous to use a dye which is soluble in the wax, but if this is impossible, a solubilizer must be used. One of the advantages of using the wax-graft copolymers of this invention is that the dye is soluble in the wax and no solubilizer is necessary. In general, any solubilizer, which is used will detract from the qualities of the finished ink, i.e., will cause dye bleed, soften the ink, cause frosting, etc. In some instances it is possible to completely eliminate the dye, but this is the exception rather than the rule.

A wax, to be useful for this purpose, must have many specific properties when used in small concentration in the finished ink; for example, in concentrations of from 8% to 12% in one-time carbon paper inks, or in higher percentages, up to 30% or 40%, in typewriter carbons.

It seems that most of the desirable characteristics required in a one-time carbon paper ink must be imparted by small percentages of wax. This is particularly true of one-time carbon paper inks. Since these waxes must have so many specific characteristics, which seem to be specific for only carnauba and ouricury wax, it is not surprising that these two natural waxes are widely used as one of the components of carbon paper inks and that there are no synthetic materials which can completely replace these materials in the percentages in which they are used. It was quite surprising that many of the products of this invention have a combination of all the desirable characteristics required and that the materials serve as complete replacements for the expensive natural waxes, carnauba and ouricury in many applications and in some respects these waxes are actually superior to the two natural waxes.

To be useful for carbon paper inks a wax must be able to dissolve the dye, such as methyl violet, Victoria blue, nigrosine, etc., preferably without the addition of a solubilizer, such as oleic acid. In this respect, the waxes of this invention are much superior to the natural waxes carnauba, ouricury, and montan which are almost universally used in one-time carbons. A wax must also produce good flow in a one-time carbon paper ink so that a thin uniform coating can be obtained. To produce good flow, a wax should give an ink of low viscosity, no thixotropy and no yield value (be Newtonian). The dispersion of the carbon black and the viscosity of the wax are the important variables which influence the flow of the finished ink. The ability of a wax to disperse carbon can be measured by the procedure described by Gale and Staneslow in the aforementioned article. If a wax gives B-type dispersion or better, at 6%, no flow difficulties would be expected. Also, in this respect, many of the products of this invention are equal to or superior to the natural waxes ouricury, carnauba and montan.

A wax must also yield a finished ink which is hard and which will not bleed oil. These properties can be easily tested, at least to a certain degree, by determining the oil retention penetration and the oil retention of a wax oil blend. In this respect, the waxes of this invention show great value and are comparable, in some cases superior, to carnauba, ouricury and montan, which is a property often so hard to duplicate.

The following are formulations employing wax-graft copolymers of this invention for a one-time carbon of medium intensity:

Carbon paper ink 1

| Material: | Grams |
|---|---|
| The products of this invention (Ex. 1) | 12 |
| Paraffin wax (M.P. approx. 135° F.) | 20 |
| Carbon black | 17 |
| Methyl violet | 1 |
| Mineral oil | 50 |

The paraffin wax used is a high-melting-point paraffin and the oil is a 100-second oil at 100° F. The carbon black can be a channel black such as exemplified by Peerless Beads or a cheaper channel black such as Raven 15, manufactured by Columbian Carbon Company, or a furnace black as exemplified by Statex B-12 manufactured by Columbian Carbon Company.

The above formulation may be modified in several ways to give different intensities and grades of ink; for example clay can be substituted for some of the carbon black and oil to cheapen the formula without greatly impairing quality, and other variations in the proportions of wax may be made.

A similar one-time carbon paper formulation employing clay is as follows:

Carbon paper ink 2

| Material: | Grams |
|---|---|
| A product of this invention (Ex. 1) | 12 |
| Paraffin wax (M.P. approx. 135° F.) | 25 |
| Methyl violet hydrochloride | 0.5 |
| Nigrosine base | 1 |
| ASP-100 clay | 18 |
| Carbon black | 10 |
| 300 sec. mineral oil | 17 |
| Petrolatum | 16.5 |

One type of carbon black which may be used is a channel black such as Peerless Beads or a cheaper channel black such as Raven 15 or comparable products, or mixtures of these. These waxes also find use in other types of carbon paper and ribbons such as pencil carbons, typewriter ribbons, etc. A typical one-time medium blue pencil carbon formulation is as follows:

Carbon paper ink 3

| Material: | Grams |
|---|---|
| A product of this invention (Ex. 9) | 12 |
| Paraffin wax (M.P. approx. 135° F.) | 25 |
| ASP-100 clay | 18 |
| Milori blue | 20 |
| 300 sec. mineral oil | 13 |
| Petrolatum | 12 |

A typical typewriter formulation is as follows:

Carbon paper ink 4

| Material: | Grams |
|---|---|
| A product of this invention (Ex. 9) | 25 |
| Carbon black ("Raven 15") | 18 |
| Methyl violet | 1 |
| Paraffin wax (M.P. approx. 135° F.) | 10 |
| 300 sec. mineral oil | 16 |
| Petrolatum | 30 |

As above, this formulation may be modified in many ways to obtain carbon paper ink to fit individual uses.

These inks may be prepared either in a ball mill or a three-roll mill by conventional procedures using temperatures of from approximately 190° F. to 220° F. Care must be taken when certain dyes are used not to exceed these temperatures; otherwise, the dye will decompose. These finished inks can be coated onto paper using a Mayer type coater or comparable equipment. Normally, it is best to apply approximately 2.5 lbs. of wax per ream for one-time carbons and higher quantities for typewriter carbons.

OTHER USES

This section deals with other uses for the wax-graft copolymers of this invention.

Because of their very desirable properties, particularly in reference to their excellent hardness, they are useful for blending with other materials to impart their favorable properties; for example they may be blended in small concentrations with paraffinic type waxes to yield blends with improved hardness and increased melting point. One specific application in this line would be to blend 3–10% of the hard products described in this application with paraffin wax to yield a product with better blocking characteristics.

One of the important uses for these products is for various types of polishes; for instance, floor polish, shoe polish, furniture polish, automobile polish, etc.

A typical formulation in which these products have found use is in the field of emulsion floor polishes is as follows:

Floor polish

| Material: | Grams |
|---|---|
| Example 6 of Table I | 100 |
| Oleic acid | 12 |
| Potassium hydroxide | 2 |
| Morpholine | 12 |
| Water | 800 |

The first two ingredients are blended and melted at 230° F. with agitation. The potassium hydroxide is added as a saturated solution and the mixture is stirred for 15 minutes. The morpholine is then added and stirring continued for an additional 5 minutes. The resulting mixture is then slowly added to the water at 205–210° F. with rapid agitation. After stirring for 5 minutes, the emulsion is cooled. To the cooled translucent emulsion is added 10–20% of a solution of leveling agent. A suitable leveling agent is a 12% ammonical solution of Shanco 19788 resin containing tributoxy ethyl phosphate.

A floor polish was also prepared by the above formulation employing Example 11 of Table I in similar ratios.

Many modifications of the above formulation can be made; for instance, other waxes can be used in conjunction with the above. Other leveling aids can be substituted for Shanco 19788 resin.

The above polish formulation, when spread on vinyl asbestos, tile, rubber tile, vinyl tile, etc., deposits a film which when dry is a hard, scuff- and abrasion-resistant with a high gloss and with good water resistance.

Similarly a good emulsion floor polish can be prepared from the product of Example 8 of Table I using the following formulation:

Floor polish

| Material: | Grams |
|---|---|
| Product of Ex. 8 of Table I | 100 |
| Morpholine | 12 |
| Water | 800 |

The procedure is similar to the preceding example except that the wax is melted, the morpholine is added, the mixture is stirred for five minutes at 230° F. and then added to rapidly stirred water at 205–210° F.

The above emulsion, after addition of 10 to 20% of leveling aid, deposits a hard film on vinyl asbestos, tile, rubber tile and vinyl tile, etc., of high gloss, and good water and abrasion resistance.

A good automobile and furniture polish can be prepared from the following formulation:

Automobile polish

| Material: | Grams |
|---|---|
| Ex. 2 of Table I | 35 |
| Silicone (5000 cs. visc.) | 20 |
| Mineral spirits (boiling point 275–325° F.) | 1300 |

The wax, silicone and 20% of the solvent are blended by heating to 190–200° F. When the solution is complete, the remaining solvent (at about 120° F.) is added with agitation. The mixture is cooled with agitation to prevent settling.

The above formulation was also prepared employing Ex. 3 of Table I in similar ratios.

The wax-graft copolymers of this invention are also useful as coating wax additives probably because they contain polar groups. This structural feature enhances their adhesive properties and gloss properties.

Having thus described our invention what we claim as new and desire to obtain by Letters Patent is:

1. A wax-graft copolymer composition of wax selected from the group consisting of tank bottom microcrystalline waxes, plastic microcrystalline waves, solvent extracted microcrystalline waxes. Fischer-Tropsch waxes, and mixtures thereof, having a molecular weight of from about 400 to about 3,000, a melting point of from about 140° F. to about 220° F. and a penetration of about 0+ to about 20 (ASTM Test Method D5–25 and a polymerized unsaturated monomer capable of free radical initiated polymerization grafted to said wax.

2. The composition of claim 1 where one carbon atom of the unsaturated monomer is bonded to a negative radical.

3. The composition of claim 2 where the negative radical is selected from the group consisting of an aromatic radical, a halogen radical, a carbonyl-containing radical, and a nitrile radical.

4. The composition of claim 1 where the unsaturated monomer is a vinyl carbonyl compound.

5. The composition of claim 1 where the unsaturated monomer is a vinyl carboxylate compound.

6. The composition of claim 1 where the unsaturated monomer is a vinyl ester.

7. The composition of claim 1 where the unsaturated monomer is an acrylic type ester.

8. The composition of claim 1 where the unsaturated monomer is vinyl acetate.

9. The composition of claim 1 where the unsaturated monomer is methyl methacrylate.

10. A polish containing from about 2.5% to about 11%, by weight, of the composition of claim 1.

11. A carbon paper ink containing from about 8% to about 40%, by weight, of the composition of claim 1.

References Cited

UNITED STATES PATENTS

| | | | |
|---|---|---|---|
| 2,127,381 | 8/1938 | Herrmann et al. | 260—28.5 |
| 2,561,816 | 7/1951 | Pabst et al. | 260—28.5 |
| 2,596,960 | 5/1952 | Schoenholz et al. | 260—28.5 |
| 2,681,323 | 6/1954 | Groff et al. | |
| 2,706,719 | 4/1955 | Newberg et al. | |
| 2,928,797 | 3/1960 | Brunson et al. | 260—28.5 |
| 2,944,039 | 7/1960 | Jolly. | |
| 2,964,456 | 12/1960 | Saunders et al. | 260—28.5 |
| 2,979,476 | 4/1961 | Bishop et al. | |
| 3,030,322 | 4/1962 | Schrader. | |
| 3,330,791 | 7/1967 | Mater et al. | 260—28.5 |

ALLAN LIEBERMAN, *Primary Examiner.*